United States Patent
Subba et al.

(10) Patent No.: US 9,979,058 B2
(45) Date of Patent: May 22, 2018

(54) BATTERY THERMAL ENERGY TRANSFER ASSEMBLY AND METHOD

(71) Applicant: FORD GLOBAL TECHNOLOGIES, LLC, Dearborn, MI (US)

(72) Inventors: Samir Subba, Dearborn, MI (US); Matthew Erich von der Lippe, Canton, MI (US); Daniel Paul Roberts, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 52 days.

(21) Appl. No.: 15/133,667

(22) Filed: Apr. 20, 2016

(65) Prior Publication Data

US 2017/0309977 A1    Oct. 26, 2017

(51) Int. Cl.
| | |
|---|---|
| H01M 10/6554 | (2014.01) |
| H01M 10/655 | (2014.01) |
| H01M 10/6551 | (2014.01) |
| H01M 10/613 | (2014.01) |
| H01M 10/6556 | (2014.01) |
| H01M 10/6567 | (2014.01) |
| H01M 10/625 | (2014.01) |

(52) U.S. Cl.
CPC ..... *H01M 10/6551* (2015.04); *H01M 10/613* (2015.04); *H01M 10/625* (2015.04); *H01M 10/6554* (2015.04); *H01M 10/6556* (2015.04); *H01M 10/6567* (2015.04); *H01M 2220/20* (2013.01)

(58) Field of Classification Search
None
See application file for complete search history.

(56) References Cited

U.S. PATENT DOCUMENTS

| | | |
|---|---|---|
| 4,974,119 A | 11/1990 | Martin |
| 8,541,127 B2 | 9/2013 | Tennessen et al. |
| 8,564,955 B2 | 10/2013 | Schmidt et al. |
| 8,758,924 B2 | 6/2014 | Tennessen et al. |
| 2009/0173559 A1* | 7/2009 | Nakamura ............... B60K 1/04 180/68.5 |
| 2012/0009455 A1* | 1/2012 | Yoon ..................... H01M 10/65 429/120 |

(Continued)

FOREIGN PATENT DOCUMENTS

WO    WO2013114054    *    8/2013    ........ H01M 10/6551

OTHER PUBLICATIONS

Shanmugan, Subramani and Devarjan Mutharasu, Performance of LED Using Al2O3 Thin Film as Thermal Interface Material, International Journal of Scientific & Engineering Research, Nov. 11, 2014, p. 880-883, vol. 5, Issue 11, ISSN 2229-5518.

*Primary Examiner* — Yoshitoshi Takeuchi
(74) *Attorney, Agent, or Firm* — Carlson, Gaskey & Olds, P.C.

(57) ABSTRACT

An exemplary battery thermal transfer assembly includes a thermal interface material having a first side with a plurality of protrusions compressed against a plurality of battery cells, and an opposing, second side interfacing with a thermal exchange plate. Another exemplary battery thermal transfer assembly includes a thermal interface material sheet having a first side with a plurality of protrusions compressed against a plurality of battery cells, and an opposing, second side interfacing with a thermal exchange plate.

17 Claims, 3 Drawing Sheets

(56) References Cited

U.S. PATENT DOCUMENTS

| | | | |
|---|---|---|---|
| 2012/0107662 A1* | 5/2012 | Rommler | C04B 35/536 |
| | | | 429/120 |
| 2013/0255918 A1* | 10/2013 | Wetzel | H01M 6/5038 |
| | | | 165/104.11 |
| 2013/0288098 A1 | 10/2013 | Hamlett | |
| 2015/0249238 A1* | 9/2015 | Andre | B60K 1/04 |
| | | | 429/99 |
| 2016/0020496 A1 | 1/2016 | Burrows et al. | |

* cited by examiner

BATTERY THERMAL ENERGY TRANSFER ASSEMBLY AND METHOD

TECHNICAL FIELD

This disclosure relates generally to a battery assembly having a thermal interface material. A thickness of the thermal interface material is increased in some areas to facilitate a transfer of thermal energy.

BACKGROUND

Electrified vehicles differ from conventional motor vehicles because electrified vehicles are selectively driven using one or more electric machines powered by a battery pack. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

Battery packs of electrified vehicles typically include a plurality of arrays each having individual battery cells that are periodically recharged to replenish the energy necessary to power the electric machines. Battery cells can heat up during charging and discharging, and during other stages of operation. Operating the battery cells at certain temperatures can improve the capacity and the life of the battery cells.

SUMMARY

A battery thermal transfer assembly according to an exemplary aspect of the present disclosure includes, among other things, a thermal interface material having a thickness that is increased in some areas to accommodate variations in a distance between a thermal exchange plate and an array of battery cells.

Another example of the foregoing assembly includes the array of battery cells disposed along an axis. A thickness of an axially central region of the thermal interface material is increased relative to a thickness of an axial end region of the thermal interface material.

In another example of any of the foregoing assemblies, the areas of the thermal interface material having the thickness that is increased are continuously and uninterruptedly joined with all the other areas of the thermal interface material.

Another example of any of the foregoing assemblies includes the thermal exchange plate and the array of battery cells. A first surface of the thermal interface material faces the thermal exchange plate and an opposing, second surface of the thermal interface material faces the array of battery cells. The second surface has a convex profile relative to the first surface.

In another example of any of the foregoing assemblies, the thickness is a distance between the first surface and the second surface.

In another example of any of the foregoing assemblies, the thermal interface material contacts the thermal exchange plate exclusively on surfaces that face the array of battery cells.

Another example of any of the foregoing assemblies includes a first surface of the thermal interface material facing the thermal exchange plate and an opposing, second surface of the thermal interface material facing the array of battery cells. The second surface includes a plurality of protrusions.

In another example of any of the foregoing assemblies, each protrusion in the plurality of protrusions has a triangular cross-sectional profile.

A battery thermal exchange assembly according to another exemplary aspect of the present disclosure includes, among other things, a thermal interface material sheet having a first side with a plurality of protrusions compressed against a plurality of battery cells, and an opposing, second side interfacing with a thermal exchange plate.

In another example of the foregoing assembly, each of the protrusions in the plurality of protrusions extends from a base to terminate at a tip portion. The thermal interface material sheet is positioned relative to the array of battery cells such that the tip portion contacts the array of battery cells at positions spaced from an interface between axially adjacent battery cells.

In another example of any of the foregoing assemblies, the plurality of protrusions are arranged in rows. Each of the rows is axially aligned with one of the battery cells.

In another example of any of the foregoing assemblies, each of the plurality of protrusions has a triangular cross-sectional profile.

In another example of any of the foregoing assemblies, a thickness of the thermal interface material sheet varies to track variations in a distance between a thermal exchange plate and an array of battery cells.

Another example of any of the foregoing assemblies includes the thermal exchange plate and the array of battery cells. The second side faces the thermal exchange plate and the first side faces the array of battery cells. The second side has a convex profile relative to the first surface. The thickness is a distance between the first side and the second side.

A battery thermal energy transfer method according to another exemplary aspect of the present disclosure includes passing thermal energy from some battery cells in an array of battery cells through a first section of a thermal interface material to a thermal exchange plate, and passing thermal energy from other battery cells in the array of battery cells through a second section of the thermal interface material to the thermal exchange plate. The first section has a first thickness that is different from a second thickness of the second section.

In another example of the foregoing method, the first section includes a plurality of protrusions.

In another example of any of the foregoing methods, the plurality of protrusions are arranged in rows. Each of the rows is axially aligned with one of the battery cells.

In another example of any of the foregoing methods, each of the plurality of protrusions has a triangular cross-sectional profile.

In another example of any of the foregoing methods, the first section is thicker than the second section and the first section is positioned near an axial middle of the plurality of battery cells.

In another example of any of the foregoing methods, a first surface of the thermal interface material faces the thermal exchange plate and an opposing, second surface of the thermal interface material faces the array of battery cells. The second surface has a convex profile relative to the first surface, and the first and second thicknesses are distances between the first surface and the second surface within the first section and the second section, respectively.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to a thermal energy transfer assembly for a battery. The assembly includes, among other things, a thermal interface material (TIM) that can be sandwiched between an array of battery cells and a thermal exchange plate. The battery can be a traction battery.

A thickness of the TIM is increased in some areas to track variations in a distance between the array and the thermal exchange plate. The increased thickness can ensure that the array and the thermal exchange plate remain in contact with the TIM, which can facilitate thermal energy transfer. In the prior art, flat sheets of a TIM are used. These sheets have a consistent thickness and relatively high forces are required to ensure sufficient contact between the array and the TIM. The forces could exceed 100 psi, which can undesirably bend the array, the thermal exchange plate, or both.

Figure 1:
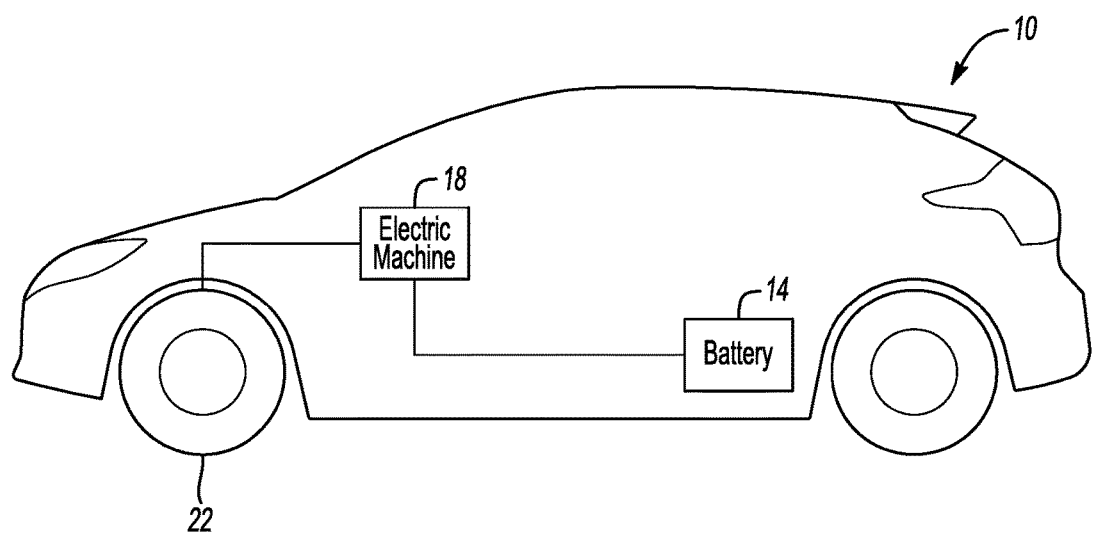
FIG. 1 shows a side view of an example electrified vehicle.

Referring to FIG. 1, an example electrified vehicle 10 includes a battery pack 14, an electric machine 18, and a pair of vehicle drive wheels 22. The electric machine 18 can receive electric power from the battery pack 14. The electric machine 18 converts the electric power to torque that drives the wheels 22. The battery pack 14 is a relatively high-voltage traction battery in some embodiments.

The exemplary vehicle 10 is an all-electric vehicle. In other examples, the electrified vehicle 10 is a hybrid electric vehicle, which can selectively drive the wheels 22 with torque provided by an internal combustion engine instead of, or in addition to, the electric machine 18.

Figure 2:
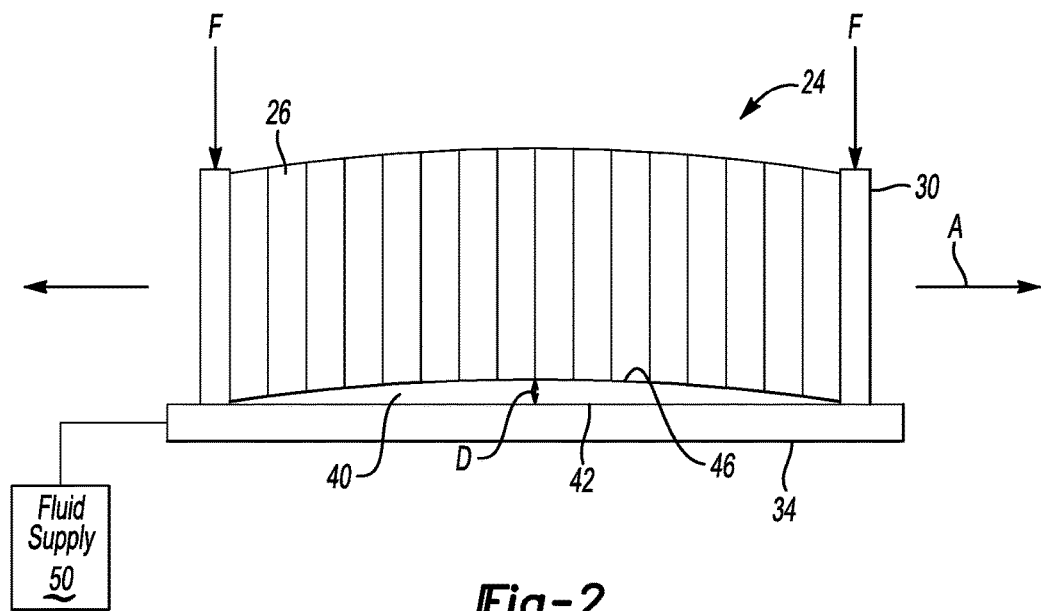
FIG. 2 shows a schematic view of an array from a battery of the vehicle of FIG. 1.

Referring now to FIG. 2 with continuing reference to FIG. 1, an array 24 includes a plurality of individual battery cell assemblies 26 disposed along an axis A and sandwiched axially between endplates 30. The battery pack 14 can include the array 24 and several other arrays.

The battery cell assemblies 26 and endplates 30 are disposed adjacent to a thermal exchange plate 34. The thermal exchange plate 34 is used to control thermal energy levels within the battery cell assemblies 26 and other areas of the battery pack 14.

Sandwiched between the battery cell assemblies 26 and the thermal exchange plate 34 is a TIM 40. A first side 42 of the TIM 40 faces the thermal exchange plate 34. An opposing, second side 46 of the TIM 40 faces the battery cell assemblies 26. The TIM 40 is used to transfer thermal energy from the battery cell assemblies 26 to the thermal exchange plate 34.

The TIM 40 directly contacts downwardly facing surfaces of the battery cell assemblies 26. The first side 42 faces vertically downward, and the second side 46 faces vertically upward. Vertical is with reference to horizon or ground. Other orientations are possible. That is, in other examples, the TIM 40 could be positioned in other areas of the array 24 depending on, among other things, how the thermal exchange plate 34 is positioned relative to the battery cell assemblies 26.

Thermal energy in the battery cell assemblies 26 can increase during charging and discharging, and during other stages of operation. The TIM 40 receives thermal energy from the battery cell assemblies 26. The battery cell assemblies 26 could include thermal fins (not shown) that directly contact the TIM 40. The thermal fins facilitate thermal energy transfer from the battery cell assemblies 26 to the TIM 40.

Thermal energy from the battery cell assemblies 26 is transferred through the TIM 40 to the thermal exchange plate 34. A fluid, such as a coolant, can circulate from a fluid supply 50 to and from passages within the thermal exchange plate 34. The fluid carries thermal energy from the thermal exchange plate 34 to cool the battery cell assemblies 26 and other portions of the battery pack 14.

Tolerance stack ups, build variations, and other factors can cause a distance D between the battery cell assemblies 26 and the thermal exchange plate 34 to vary at different areas. In this example, compressing the battery cell assemblies 26 has caused the battery cell assemblies 26 near an axial median of the array 24 to move further away from the thermal exchange plate 34 than the battery cell assemblies 26 at the axial ends of the array 24. That is, the distance between the battery cell assemblies 26 and the axial median of the array 24 is greater than the distance between the thermal exchange plate 34 and the battery cell assemblies 26 at the axial ends of the array 24. The distance is exaggerated in FIG. 2 for drawing clarity.

As can be appreciated, direct contact between the TIM 40 and the battery cell assemblies 26 and the thermal exchange plate 34 can facilitate transfer of thermal energy from the battery cell assemblies 26 to the thermal exchange plate 34. The example TIM 40 incorporates features to facilitate direct contact between the TIM 40 and the battery cells assemblies 26.

Figure 3:
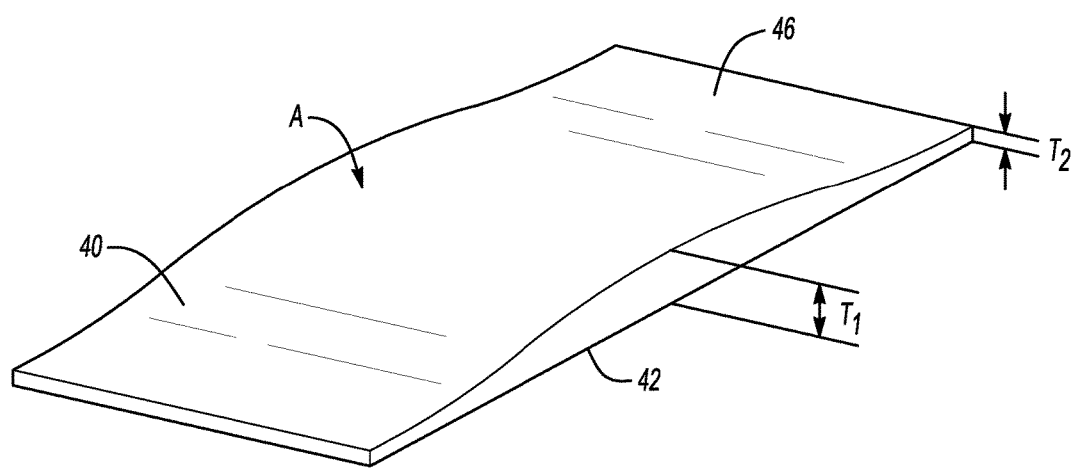
FIG. 3 shows a perspective view of a thermal interface material used in the array of FIG. 2.
Figure 4:
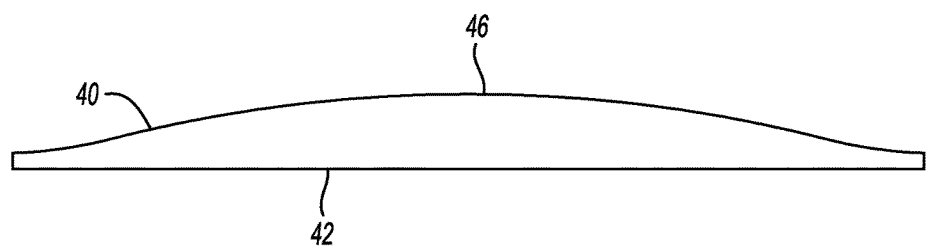
FIG. 4 shows a side view of the thermal interface material of FIG. 3.
Figure 5:
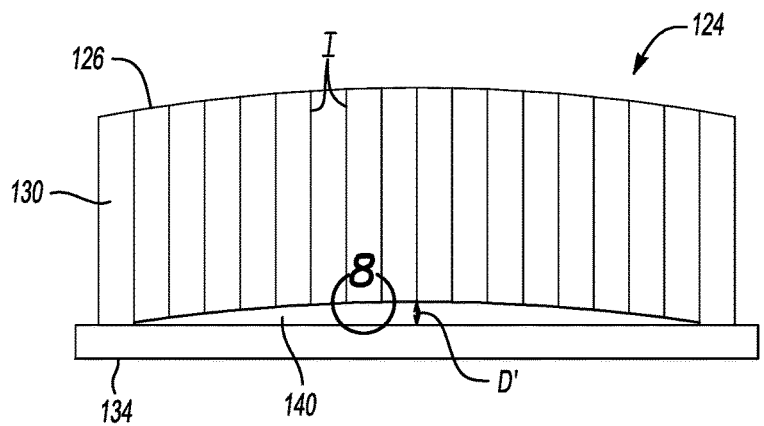
FIG. 5 shows a side view of another example array for use in the battery of the vehicle of FIG. 1.
Figure 6:
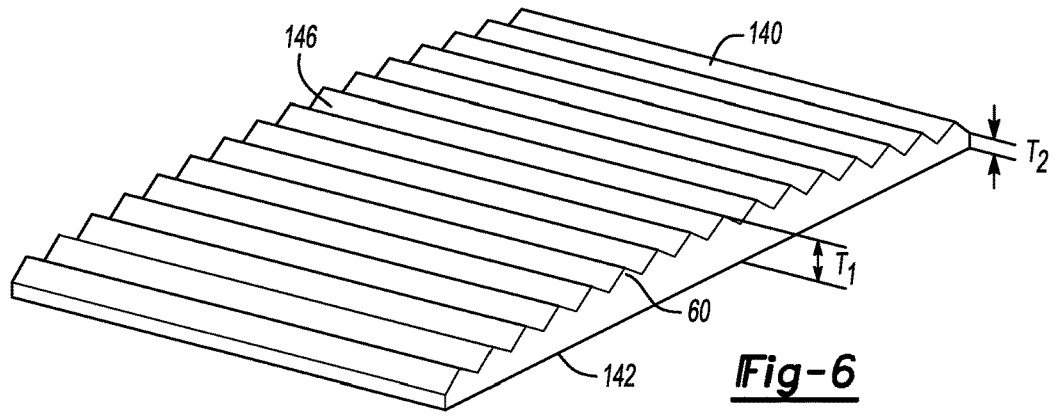
FIG. 6 shows a perspective view of a thermal interface material from the array of FIG. 5.
Figure 7:
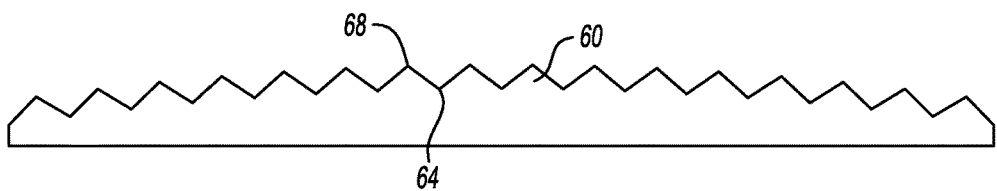
FIG. 7 shows a side view of the thermal interface material of FIG. 6.

Referring now to FIGS. 3 and 4 with continuing reference to FIG. 2, the TIM 40 has a thickness T that is increased in an area A to compensate for the battery cell assemblies 26 near the axial median of the array 24 being further from the thermal exchange plate 34 than the battery cell assemblies 26 at the axial ends of the array 24. That is, a thickness $T_1$ of the TIM at an axially central region of the TIM 40 is greater than a thickness $T_2$ of an axial end region of the TIM 40. The increased thickness causes the second side 46 of the TIM 40 to have a three-dimensional surface.

In this example, the TIM 40 is a molded material. To provide the increased thickness, the TIM 40 is molded such that the second side 46 has a convex profile relative to the first side 42. The TIM 40, after molding, and prior to installation within the array 24, exhibits the convex profile on the second side 46 and the resulting thicker axially central region. During molding, one or more liquid materials can be poured into a mold or liner having a surface mimicking a desired profile (here, a convex profile) for the second side 46. The TIM 40 is thus formed as a single, unitary and continuous structure with no interruptions.

The TIM 40 could also have a curved laterally extending profile such that the TIM 40 is thinner at the lateral edges than at the center.

The increased thickness $T_1$ ensures that the battery cell assemblies 26 near the axial center of the array 24 maintain contact with the TIM 40 even though these battery cell assemblies 26 are further from the thermal exchange plate 34 than the battery cell assemblies 26 at the axial ends of the array 24.

Software, such as computer-aided engineering software, could be utilized to design the increased thickness $T_1$. For example, the software could be used to determine a maximum distance between the battery cell assemblies 26 and the thermal exchange plate 34. The thickness $T_1$ is then made to reflect the maximum distance. The TIM 40 is thus customized for a particular environment.

Referring now to FIGS. 5-8, another example array 124 includes battery cell assemblies 126 compressed axially between end plates 130 and disposed upon a thermal exchange plate 134. A TIM 140 is sandwiched between the battery cell assemblies 126 and the thermal exchange plate 134. The TIM 140 has a first side 142 that interfaces with the thermal exchange plate 34 and a second side 146 to interface with the battery cell assemblies 126. The TIM 140 has a thickness $T_1$ at its axially central region that is greater than a thickness $T_2$ at its axial ends. The TIM 40 has a generally planar orientation and, thus is considered a TIM sheet.

Notably, the second side 146 of the TIM 140 includes a plurality of protrusions 60. The second side 146 being convex, and the protrusions 60, together to accommodate variations in a distance D' between the battery cell assemblies 126 and the thermal exchange plate 134.

The example protrusions 60 are shown extending from the second side 146. In another example, the protrusions 60 could extend from the first side 142, or from both the first side 142 and the second side 146.

In this example, the protrusions have a generally triangular profile, and each of the protrusions 60 extends from a base 64 to a tip portion 68. The example protrusions 60 are positioned axially to each align with one of the battery cell assemblies 26. More specifically, the protrusions 60 are positioned axially so that the tip portions 68 each contact an individual one of the battery cell assemblies 126 at a position spaced from an interface I between axially adjacent battery cell assemblies 126.

In some examples, the protrusions 60 are formed within the TIM 140 such that the tip portion 68 of each of the protrusions 60 is positioned or very near at an axial center Ac (FIG. 8) of the corresponding one of the battery cell assemblies 126. In such an example, the array 124, which includes sixteen individual battery cell assemblies 126, incorporates a TIM 140 having sixteen individual protrusions 60. The tip portions 68 of each of the sixteen individual protrusions 60 generally aligns with a corresponding axial center of one of the battery cell assemblies 126.

Aligning the tip portions 68 with the axial centers of the battery cell assemblies 126 can facilitate increased contact between the TIM 140 and the battery cell assemblies 126. For example, when the array 124 is assembled, the battery cell assemblies 126 are compressed against the TIM 140. The compression forces the tip portions 68 toward the thermal exchange plate 134. The triangular profile of the protrusions 60 facilitates progressive compression of the protrusions 60 to enhance contact between the protrusions 60 and the battery cell assemblies 126.

Figure 8:
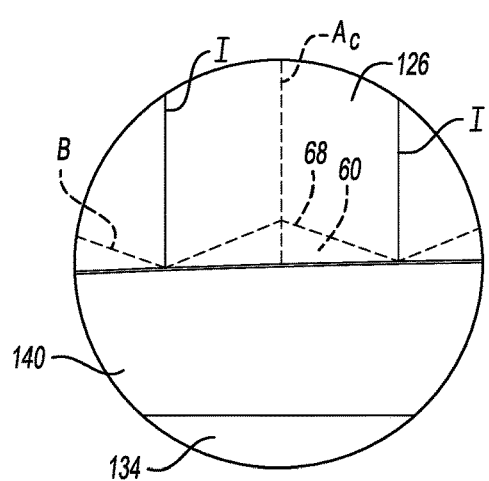
FIG. 8 shows a close-up view of Area-8 in FIG. 5.

A broken line B in FIG. 8 represents a profile of the protrusions 60 prior to assembly. As shown, the battery cells assemblies 126 press the protrusions 60 toward the thermal exchange plate 134 when assembled. In the example battery cells assemblies 126, thermal energy levels are higher near the axial centers of the battery cells assemblies 126 than near the interfaces I. The tip portions 68 are aligned with the axial center Ac, which ensures good contact between the TIM 140 and the axial center Ac and that areas of the battery cells assemblies 126 having the most thermal energy will be in contact with the TIM 140.

In some examples, if more compression of one or more of the protrusions 60 is desired, a height of the protrusions 60 can be increased such that the tip portion 68 is positioned further from the base 64 prior to assembly. Adjusting a height of the protrusions can modify a reaction force profile when the battery cells assemblies 126 and thermal exchange plate 134 are pressed relatively toward each other.

Other example profiles for the protrusions 60 can include a rectangle or oval profile. In some examples, some or all of the protrusions 60 can be finger-like protrusions that are canted or slanted relative to the axis A.

Features of some of the disclosed examples include a TIM that can facilitate contact between battery cells assemblies and the TIM. The contact can help reduce temperatures of the battery cell assemblies, increase battery life, and permit more efficient battery pack operation. Further, the TIM of the present disclosure can require less force to ensure contact between the TIM and the battery cells. Less force decreases a likelihood of bending the thermal exchange plate and the array of battery cell assemblies, and decrease a likelihood of damage to the battery cell assemblies, TIM, thermal exchange plate, etc.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A battery thermal transfer assembly, comprising:
    a thermal exchange plate;
    an array of battery cells; and
    a thermal interface material having a thickness that is greater than zero in some areas and is increased in other areas to accommodate variations in a distance between the thermal exchange plate and the array, the thermal interface material including opposing first and second sides, at least one of the first or the second sides has a convex profile; and
    a plurality of protrusions of the first side compressed against the array of battery cells, and the second side interfacing with the thermal exchange plate.

2. The assembly of claim 1, comprising the array of battery cells disposed along an axis, wherein the thickness of an axially central region of the thermal interface material is gradually increased relative to the thickness of an axial end region of the thermal interface material.

3. The assembly of claim 1, wherein the areas of the thermal interface material having the thickness that is increased are continuously and uninterruptedly joined with all the other areas of the thermal interface material.

4. The assembly of claim 1, wherein the thickness is a distance between the first side and the second side.

5. The assembly of claim 1, wherein the thermal interface material contacts the thermal exchange plate exclusively on surfaces of the thermal exchange plate that face the array of battery cells.

6. The assembly of claim 1, wherein each protrusion in the plurality of protrusions has a triangular cross-sectional profile.

7. The assembly of claim 1, wherein each of the protrusions in the plurality of protrusions extends from a base to terminate at a tip portion, the thermal interface material position relative to the array of battery cells such that the tip portion contacts the array of battery cells at positions spaced from an interface between axially adjacent battery cells in the array of battery cells.

8. The assembly of claim 1, wherein the plurality of protrusions are arranged in rows, each of the rows axially aligned with one of the battery cells in the array of battery cells.

9. The assembly of claim 1, wherein each of the plurality of protrusions has a triangular cross-sectional profile.

10. The assembly of claim 1, wherein a thickness of the thermal interface material sheet varies to track variations in a distance between the thermal exchange plate and the array of battery cells.

11. The assembly of claim 10, wherein the second side faces the thermal exchange plate and the first side faces the array of battery cells, the second side having a convex profile relative to the first side, wherein the thickness is a distance between the first side and the second side.

12. A battery thermal transfer assembly, comprising:
a thermal exchange plate;
a plurality of battery cells; and
a thermal interface material sheet having a first side with a plurality of protrusions compressed against the plurality of battery cells, and an opposing, second side interfacing with the thermal exchange plate, at least one of the first or the second side has a convex profile.

13. The assembly of claim 12, wherein each of the protrusions in the plurality of protrusions extends from a base to terminate at a tip portion, the thermal interface material position relative to the array of battery cells such that the tip portion contacts the array of battery cells at positions spaced from an interface between axially adjacent battery cells.

14. The assembly of claim 12, wherein the plurality of protrusions are arranged in rows, each of the rows axially aligned with one of the battery cells.

15. The assembly of claim 12, wherein each of the plurality of protrusions has a triangular cross-sectional profile.

16. The assembly of claim 12, wherein a thickness of the thermal interface material sheet varies to track variations in a distance between the thermal exchange plate and the plurality of battery cells.

17. A battery thermal transfer assembly, comprising:
a thermal exchange plate;
a plurality of battery cells; and
a thermal interface material sheet having a first side with a plurality of protrusions compressed against the plurality of battery cells, and an opposing, second side interfacing with the thermal exchange plate,
wherein a thickness of the thermal interface material sheet varies to track variations in a distance between the thermal exchange plate and the plurality of battery cells,
wherein the second side faces the thermal exchange plate and the first side faces the plurality of battery cells, the second side having a convex profile relative to the first side, wherein the thickness is a distance between the first side and the second side.

* * * * *